A. SHEETZ.
SEED PLANTER.
APPLICATION FILED FEB. 14, 1911.
1,006,984.
Patented Oct. 24, 1911.
3 SHEETS—SHEET 1.
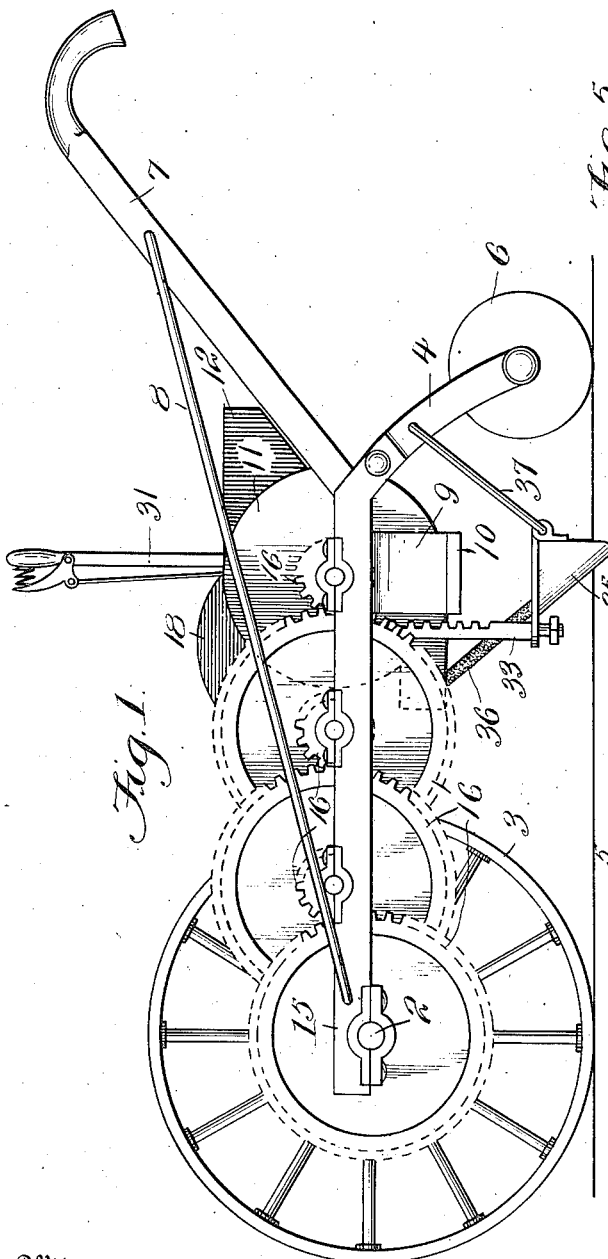
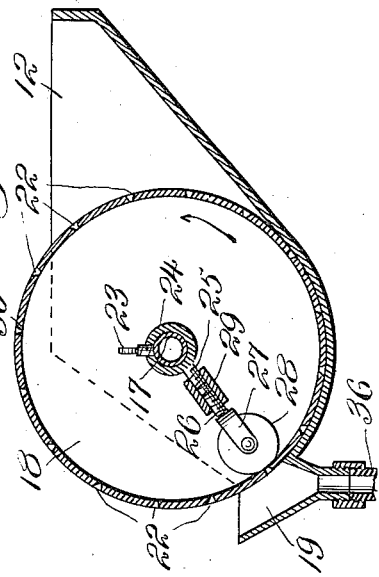
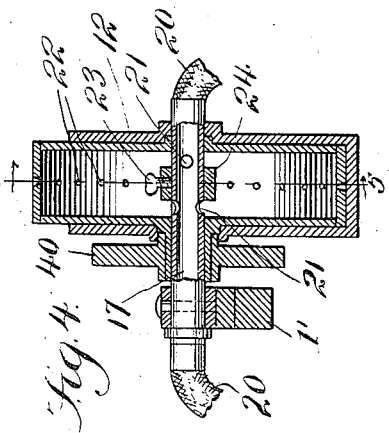
Inventor
Albert Sheetz,
By Victor J. Evans,
Attorney
Witnesses

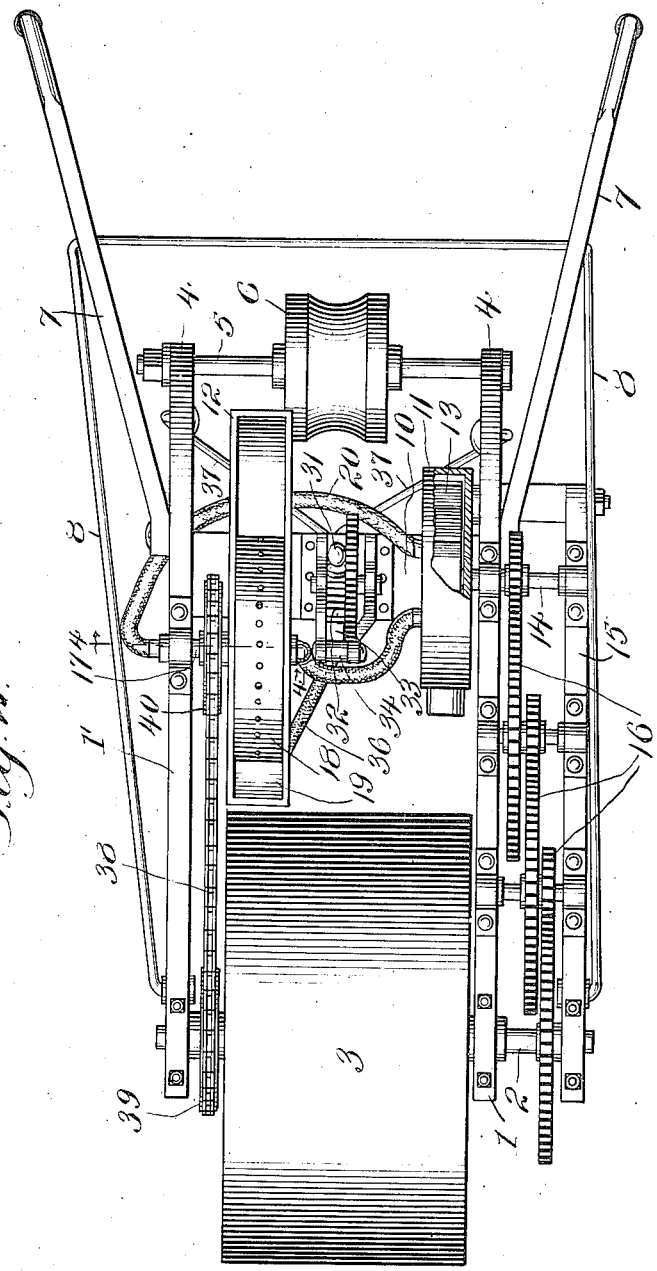

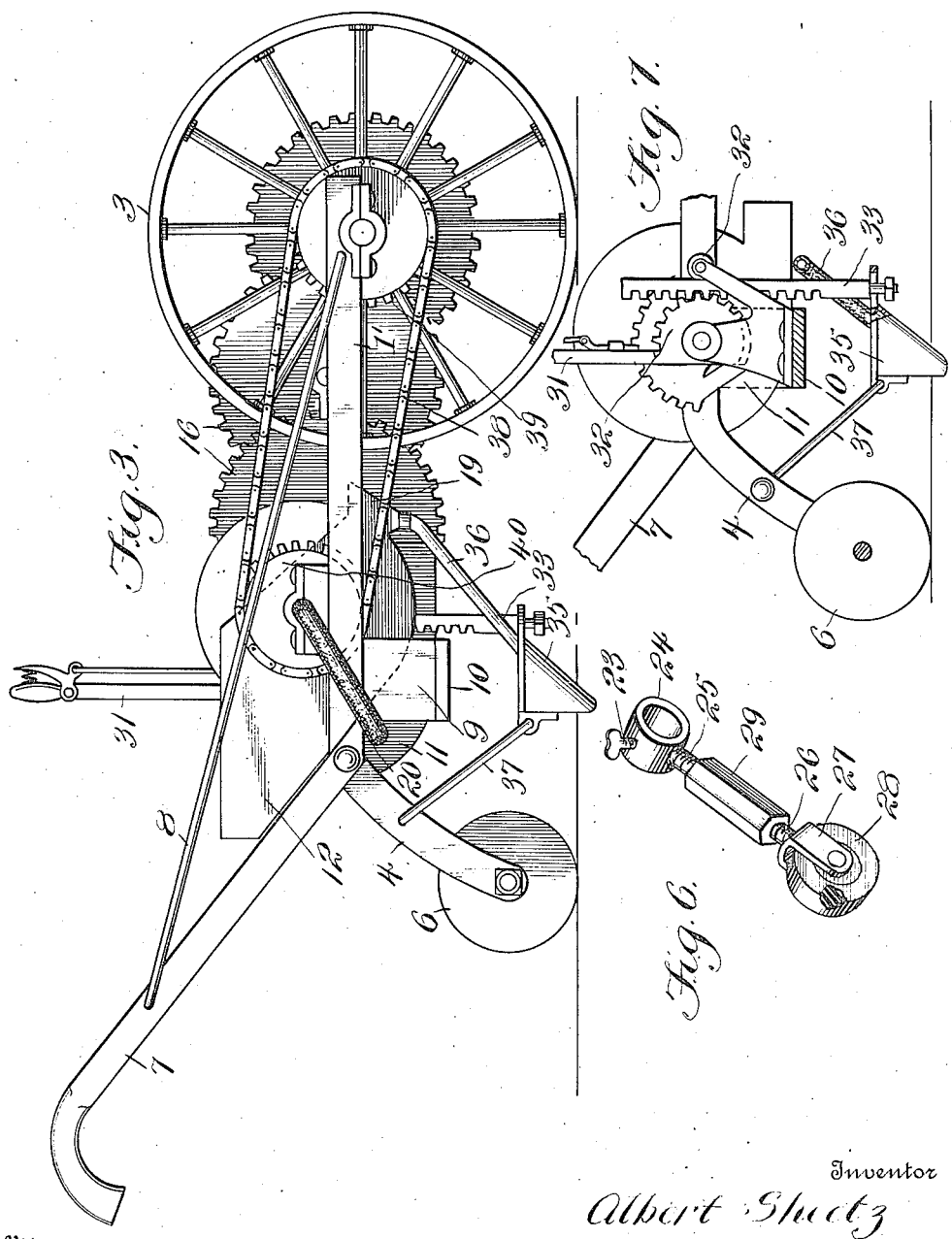

ations:
UNITED STATES PATENT OFFICE.

ALBERT SHEETZ, OF BISBEE, ARIZONA TERRITORY.

SEED-PLANTER.

1,006,984.   Specification of Letters Patent.   Patented Oct. 24, 1911.

Application filed February 14, 1911. Serial No. 608,528.

*To all whom it may concern:*

Be it known that I, ALBERT SHEETZ, a citizen of the United States of America, residing at Bisbee, in the county of Cochise and Territory of Arizona, have invented new and useful Improvements in Seed-Planters, of which the following is a specification.

This invention relates to seed planters and particularly to means for planting small garden seed such as onion seed and the like.

The principal object of the invention is to provide an improved construction whereby small seeds, such as onion seed may be deposited singly, instead of in quantities, as is usually done, thereby avoiding the necessity for subsequently thinning the growing plants and consequently reducing the work of cultivating garden truck and the like.

With these and other ends in view which will readily appear as the nature of the invention is better understood, the same consists essentially in a pneumatic device of simple and improved construction whereby the seeds will be carried singly from the hopper or receptacle wherein they are contained to the seed tube through which they are dropped upon the ground or in a furrow provided for their reception.

The invention further consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a seed planter constructed in accordance with the invention. Fig. 2 is a top plan view. Fig. 3 is a side elevation of the machine as seen from the opposite side to that shown in Fig. 1. Fig. 4 is a transverse sectional view, enlarged taken on the line 4—4 in Fig. 2. Fig. 5 is a sectional view taken on the line 5—5 in Fig. 4. Fig. 6 is a perspective view showing the device constituting the cut-off, detached. Fig. 7 is a detail view, partly in side elevation and partly in section, of a portion of the machine illustrating particularly the means for effecting vertical adjustment of the furrow opener.

Corresponding parts in the several figures are denoted by like characters of reference.

The frame of the improved seed planter includes suitably connected side members 1, 1' having bearings for a shaft or axle 2 carrying a transporting wheel 3 which has been shown as having a wide tread. The frame is provided near its rear end with arms or brackets 4 having bearings for a shaft 5 carrying an annularly grooved covering wheel 6. The frame is also equipped with handles 7 whereby the machine may be conveniently manipulated, said handles being reinforced by braces 8. The side members of the frame are provided with downwardly extending brackets 9 supporting a cross bar 10 upon which a fan casing 11 and the seed box 12 are suitably mounted and supported. The fan 13 within the casing 11 is mounted upon a shaft 14 which is supported for rotation in suitable bearings upon the proximate frame bar 1 and upon an auxiliary frame bar 15 which is connected with and spaced from the said frame bar in any convenient manner. The auxiliary frame bar 15 also affords a bearing for an extension of the shaft or axle 2. Motion is transmitted from the axle 2 to the fan carrying shaft 14 by means of a train of gears 16 suitably supported by the frame bars 1 and 15, it being obvious that chains and sprockets or other well known transmission means may be substituted for the gearing.

The sides of the casing which constitutes the hopper 12 are provided with bearings for a stationary tubular shaft 17 carrying the rotary seed wheel which consists of a hollow cylindrical drum 18, a portion of the periphery of which dips into the seed box, while another portion overhangs the front wall of the latter and is disposed directly above the upper end of the seed tube 19. The two ends of the tubular shaft 17 are connected by tubes or ducts 20 with the inlet of the fan casing, and the said tubular shaft 17 is provided within the hollow drum with apertures 21 through which, when the fan is in motion, air will be exhausted from the said tubular drum. The rim of the latter is provided with a circumferential row of small apertures 22, said apertures being of a cross sectional area which is less than the diameter of the seeds that are to be planted, so that the seeds will not be capable of passing through said openings.

Secured upon the tubular shaft 17 within the drum or casing 18 by means of a set screw 23 is a band or collar 24 having a radially extending screw threaded arm 25. A similar arm 26, which is threaded reversely to the arm 25, carries a yoke 27 in which a wheel or disk 28, made preferably of soft rubber, or some other suitable elastic material, is supported for rotation. A right and left threaded nut or coupling sleeve 29 connects the arm 26 with the arm 25, and it will be seen that by proper adjustment of said coupling sleeve, the resilient or flexible wheel 28 may be caused to bear with a suitable degree of pressure against the inner face of the rim 30 of the drum 18. The band 24 is to be adjusted upon the tubular shaft in such a position that the inner ends of the apertures 22 will be engaged and covered by the wheel 28, which latter constitutes a cut-off.

Suitably fulcrumed upon the frame of the machine is a hand lever 31 carrying a rack segment 32 that meshes with a vertically movable rack 33 which is held in contact with the segment by means of an anti-friction roller 34. The lower end of the rack bar 33 carries the shoe or furrow opener 35 which is connected by means of a flexible hose or duct 36 with the seed tube 19. The furrow opener may also be connected with the arms 4 by means of link braces 37.

Motion may be transmitted from the shaft or axle 2 to the seed drum upon the tubular shaft 17 by means of a chain 38 engaging sprocket wheels 39, 40 upon the axle and the drum, respectively, or in any other convenient and well known manner.

In operation, the machine may be pushed over the ground by the operator or, when on a large scale, it may be propelled by one or more draft animals. Motion is transmitted from the transporting wheel 1 to the fan within the casing 11 and also to the seed wheel or drum 12, the latter being rotated at relatively slow speed. By the suction set up by the fan air is exhausted from the interior of the drum or seed wheel, causing seeds to adhere to the latter at the outer ends of the apertures 22 by the pressure of the external air. The seeds are carried around with the drum until at the proper point, when the seed is directly above the upper end of the seed tube, the suction is interrupted by the cut-off wheel, thus causing the seed to become detached and to drop by gravity into the seed tube, whence it is conducted through the duct 36 to the furrow formed by the shoe or furrow opener 35, being subsequently slightly covered by the action of the covering wheel 6.

From the foregoing description, taken in connection with the drawings hereto annexed, the operation and advantages of this invention will be readily understood. While, perhaps, mainly applicable to machines for planting small garden seed, such as onion seed, radish seed and the like, it is obvious that by using seed wheels or drums with apertures of proper dimensions and properly spaced apart, other seeds may be successfully planted, and no limitation is made in this respect.

Having thus described the invention, what is claimed as new, is:—

1. In a seed planter, a seed receptacle, a seed tube, a drum supported partly within the seed receptacle and partly overhanging the seed tube, said drum having a rim provided with a plurality of apertures, a tubular carrying shaft for said drum having apertures opening within the drum, means for exhausting air from the drum through the tubular shaft, and a cut-off device supported upon the tubular shaft and engaging an inner surface of the rim of the drum.

2. In a seed planter, a hollow cylindrical seed drum having an apertured rim, tubular supporting means for said drum, means for exhausting the air from the drum through the tubular shaft, a collar adjustable upon said shaft, and a resilient wheel carried by the collar in interior engagement with the apertured rim.

3. In a seed planter, a hollow cylindrical seed wheel having an apertured rim, tubular supporting means for the same, means for exhausting air from the drum through the tubular supporting means, a collar adjustable upon the tubular supporting means within the drum, a cut-off wheel interiorly engaging the apertured drum, and means for adjustably connecting the cut-off wheel with the collar upon the tubular supporting means.

4. In a seed planter, a seed receptacle, a seed tube, pneumatic means for transferring seed from the receptacle to the tube, a vertically movable rack bar, a hand lever having a segment rack engaging the bar, an anti-friction wheel holding the rack bar in engagement with the segment, a furrow opener carried by the rack bar, and a flexible duct extending from the seed tube to the furrow opener.

In testimony whereof I affix my signature in presence of two witnesses.

ALBERT SHEETZ.

Witnesses:
M. L. BUTLER,
THOS. MUAT.